(12) United States Patent
Chen et al.

(10) Patent No.: US 10,189,238 B2
(45) Date of Patent: Jan. 29, 2019

(54) EXPOSURE MOLDING DEVICE AND EXPOSURE MOLDING METHOD THEREOF

(71) Applicant: TECO IMAGE SYSTEMS CO., LTD., Taipei (TW)

(72) Inventors: Ting-Chun Chen, Taipei (TW); Yu-Jen Chang, Taipei (TW); Ken-Te Chou, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 199 days.

(21) Appl. No.: 15/263,295

(22) Filed: Sep. 12, 2016

(65) Prior Publication Data
US 2018/0015642 A1    Jan. 18, 2018

(30) Foreign Application Priority Data
Jul. 14, 2016  (TW) .............................. 105122306 A

(51) Int. Cl.
*B29C 35/08* (2006.01)
*B33Y 30/00* (2015.01)
(Continued)

(52) U.S. Cl.
CPC .......... *B33Y 30/00* (2014.12); *B29C 35/0805* (2013.01); *B29C 64/129* (2017.08);
(Continued)

(58) Field of Classification Search
CPC ... B29C 35/088; B29C 35/0805; B29C 64/00; B29C 64/10; B29C 64/106;
(Continued)

(56) References Cited

U.S. PATENT DOCUMENTS 5,626,919 A  *  5/1997  Chapman ................ B29C 41/12
                                                  118/413
5,922,364 A  *  7/1999  Young, Jr. .............. B33Y 30/00
                                                  264/401
(Continued)

FOREIGN PATENT DOCUMENTS

CN         102017147 B    1/2014
CN         103839955 A    6/2014

*Primary Examiner* — Nahida Sultana
(74) *Attorney, Agent, or Firm* — Kirton McConkie; Evan R. Witt

(57) ABSTRACT

An exposure molding device comprises an exposure tank, a working platform, and an optical system. The exposure tank has a first surface and a second surface. The working platform is disposed relative to the first surface. The optical system disposed relative to the second surface comprises a light emission element and an optical assembly. The light emission element emits light along an optical path. The optical assembly comprises a light transparent element, a first optical element, and a first transmission mechanism. The light transparent element is disposed on the optical path, the first optical element is disposed behind the light transparent element on the optical path, and the first transmission mechanism is disposed along a first direction and connected with the first optical element for driving the first optical element to move along the first direction. The molding range is expanded. The accuracy, velocity and quality of molding are enhanced.

8 Claims, 12 Drawing Sheets

(51) Int. Cl.
*B33Y 10/00* (2015.01)
*B29C 64/129* (2017.01)
*B29C 64/264* (2017.01)
*B29C 64/386* (2017.01)
*B33Y 50/02* (2015.01)
*B33Y 99/00* (2015.01)

(52) U.S. Cl.
CPC .......... *B29C 64/264* (2017.08); *B29C 64/386* (2017.08); *B33Y 10/00* (2014.12); *B29C 2035/0833* (2013.01); *B33Y 50/02* (2014.12); *B33Y 99/00* (2014.12)

(58) Field of Classification Search
CPC ... B29C 64/112; B29C 64/118; B29C 64/124; B33Y 99/00; B33Y 50/02; B33Y 30/00
See application file for complete search history.

(56) References Cited

U.S. PATENT DOCUMENTS

| | | | | |
|---|---|---|---|---|
| 6,572,807 B1 * | 6/2003 | Fong | ...................... | B33Y 10/00 264/237 |
| 6,574,523 B1 * | 6/2003 | Hanna | ................... | B29C 64/135 345/420 |
| 7,063,524 B2 * | 6/2006 | Farnworth | ......... | B23K 26/0734 425/174.4 |
| 7,757,760 B2 * | 7/2010 | Sherwood | ............... | E21B 49/10 166/100 |
| 7,785,093 B2 * | 8/2010 | Holmboe | ............... | B33Y 30/00 264/308 |
| 8,743,340 B2 * | 6/2014 | Schlienger | .......... | B29C 67/0085 348/222.1 |
| 9,902,112 B2 * | 2/2018 | El-Siblani | ............. | B33Y 30/00 |
| 2008/0157412 A1 * | 7/2008 | Kihara | ................... | B33Y 30/00 264/1.1 |
| 2014/0039663 A1 * | 2/2014 | Boyer | .................... | B33Y 10/00 700/118 |
| 2015/0290874 A1 * | 10/2015 | Chen | ...................... | B33Y 30/00 425/174.4 |
| 2016/0311157 A1 * | 10/2016 | Van De Vrie | .......... | B33Y 10/00 |
| 2017/0165916 A1 * | 6/2017 | El-Siblani | ............. | B29C 64/336 |
| 2017/0173737 A1 * | 6/2017 | Gray | .................... | B23K 26/342 |

* cited by examiner

EXPOSURE MOLDING DEVICE AND EXPOSURE MOLDING METHOD THEREOF

CROSS-REFERENCE TO RELATED APPLICATION

This application claims priority from Taiwan Patent Application No. TW 105122306, filed on Jul. 14, 2016, the entire contents of which are incorporated herein by reference for all purposes.

FIELD OF THE INVENTION

The present invention relates to an exposure molding device, and more particularly to an exposure molding device and an exposure molding method thereof for expanding the molding range.

BACKGROUND OF THE INVENTION

Recently, the 3D printing, also known as the additive manufacturing (or called "AM"), is more and more general, among which the digital light processing (hereinafter "DLP") additive manufacturing is widely applied to kinds of machines. The DLP additive manufacturing is applying projection technology to project layered images of objects on photopolymer in sequence, and the layers are stacked for molding.

Since the resolution and molding velocity of the products in the DLP additive manufacturing are relevant to the projection light source, the projection area of conventional machines is narrowed to a specific range for ensuring the resolution and the optical power in a unit area, such that the object can be molded successfully. Consequently, although the accuracy, resolution and velocity of the DLP additive manufacturing are superior to other additive manufacturing methods, the DLP additive manufacturing is unable to be applied to large objects because the projection range cannot be expanded.

In prior arts, projection images with large area are divided into several sub-images. By moving the projection light source and composing the sub-images, a larger projection area can be obtained, such that the molding range of the DLP additive manufacturing is expanded. However, since the the projection light source is large and heavy, the velocity and accuracy of moving the projection light source are low, and the velocity and accuracy of molding are further affected. In addition, errors of the composing of images are caused easily because of the moving inertia and vibration of the projection light source, such that the molding quality is lowered.

Therefore, there is a need of providing an exposure molding device and an exposure molding method thereof to solve the drawbacks in prior arts, expand the molding range, and achieve the advantages of enhancing the accuracy, velocity and quality of molding.

SUMMARY OF THE INVENTION

It is an object of the present invention to provide an exposure molding device and an exposure molding method thereof in order to solve the drawbacks of prior art.

The present invention provides an exposure molding device and an exposure molding method thereof. By disposing the movable optical elements, the molding range is expanded, and the accuracy, resolution and velocity of molding are ensured.

The present invention also provides an exposure molding device and an exposure molding method thereof. Through disposing the optical compensating elements, the difference of the optical path caused by moving the optical elements is complemented, such that the distortion and deformation of the projection region are prevented, and the molding quality is ensured.

The present invention further provides an exposure molding device and an exposure molding method thereof. By moving light weight optical elements and calculating the moving velocity and the moving route according to the exposure time, the advantages of enhancing the accuracy, velocity and quality of molding are achieved.

In accordance with an aspect of the present invention, there is provided an exposure molding device. The exposure molding device comprises an exposure tank, a working platform, and an optical system. The exposure tank has a first surface and a second surface, photosensitive liquid is accommodated within the exposure tank, the working platform is disposed relative to the first surface, and the optical system is disposed relative to the second surface. The optical system comprises a light emission element and an optical assembly, and the light emission element emits light along an optical path. The optical assembly comprises a light transparent element, a first optical element, and a first transmission mechanism. The light transparent element is disposed on the optical path, the first optical element is disposed behind the light transparent element on the optical path, and the first transmission mechanism is disposed along a first direction and connected with the first optical element for driving the first optical element to move along the first direction. After the light is transmitted through the light transparent element, the light is reflected to the exposure tank by the first optical element, such that the photosensitive liquid is exposed and molded on the working platform.

In accordance with another aspect of the present invention, there is provided an exposure molding method. The exposure molding method comprises steps of: (a) providing an exposure tank, a working platform, a light emission element and an optical assembly, among which photosensitive liquid is accommodated within the exposure tank, and the optical assembly comprises a light transparent element, a first optical element, and a first transmission mechanism; (b) allowing the light emission element to emit light; (c) allowing the light to transmit through the light transparent element so as to be reflected by the first optical element to a to-be-exposed region of the exposure tank; (d) exposing and molding the photosensitive liquid at the exposing region on the working platform after an exposure time; (e) judging whether an exposure molding operation has to be performed continuously; (f) moving the first optical element along a first direction by the first transmission mechanism; and (g) finishing the exposure molding operation. If the result of the judgement of the step (e) is True, the step (f) is performed, and then the step (b) to the step (e) are re-performed again. If the result of the judgement of the step (e) is False, the step (g) is performed.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
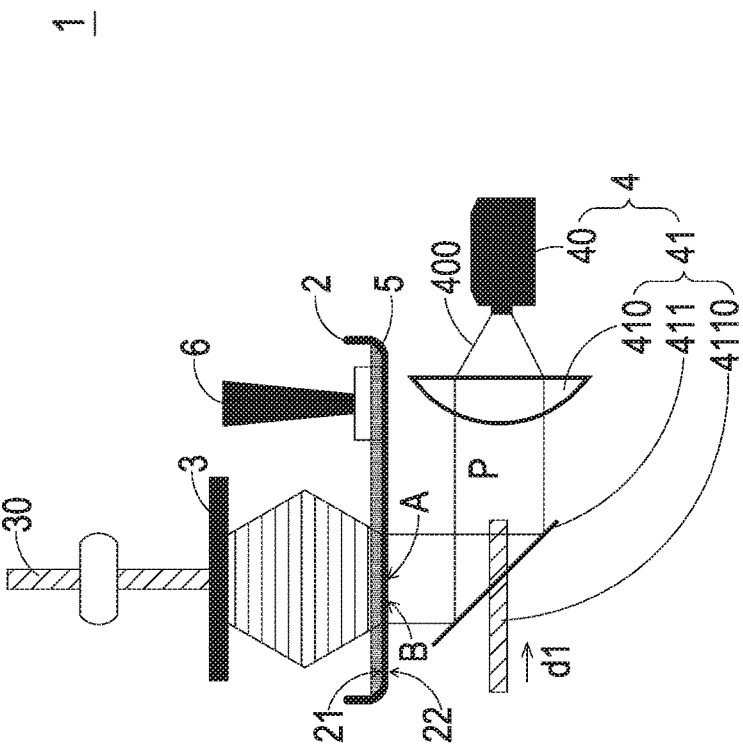
FIG. 1 schematically illustrates the configuration of an exposure molding device according to an embodiment of the present invention.
Figure 2:
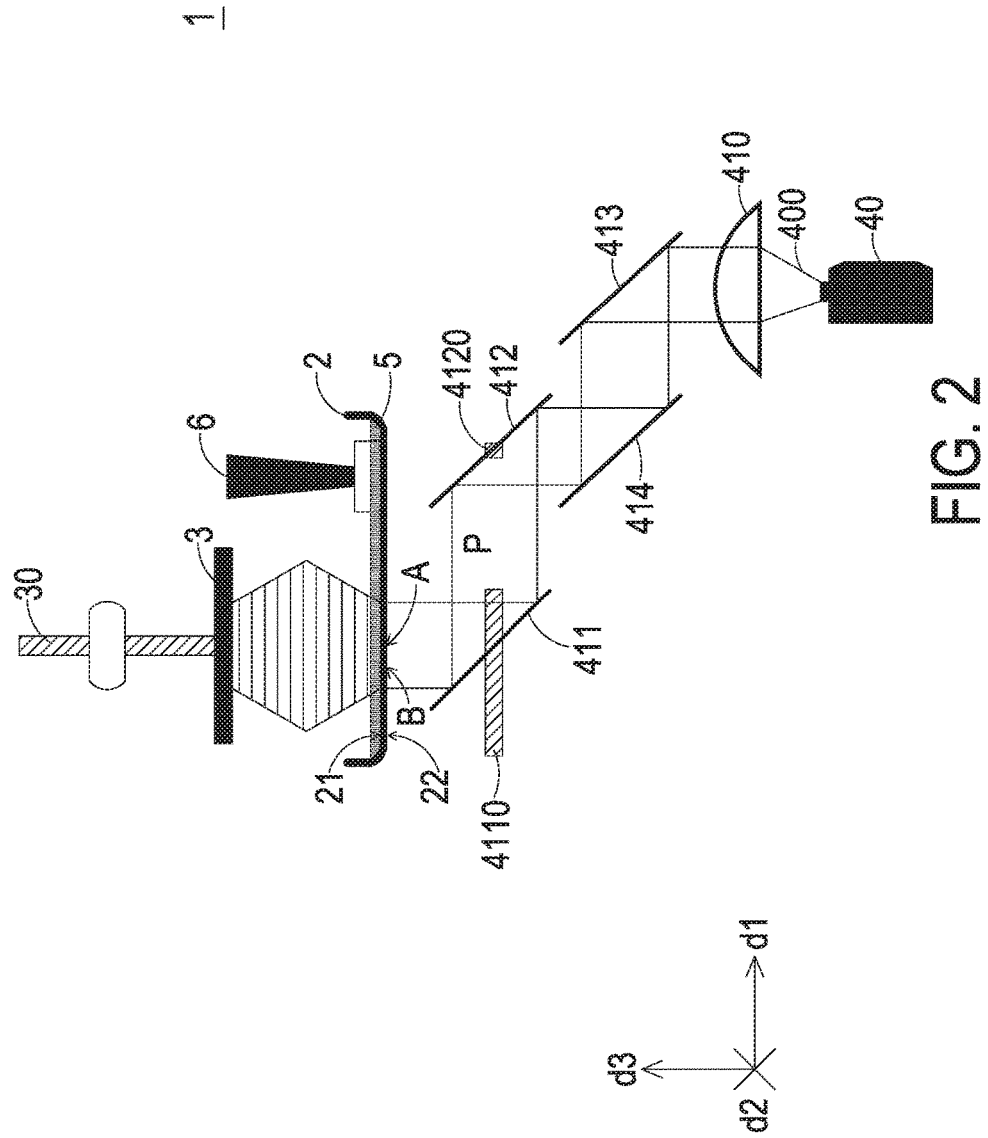
FIG. 2 schematically illustrates the configuration of an exposure molding device according to another embodiment of the present invention.
Figure 3:
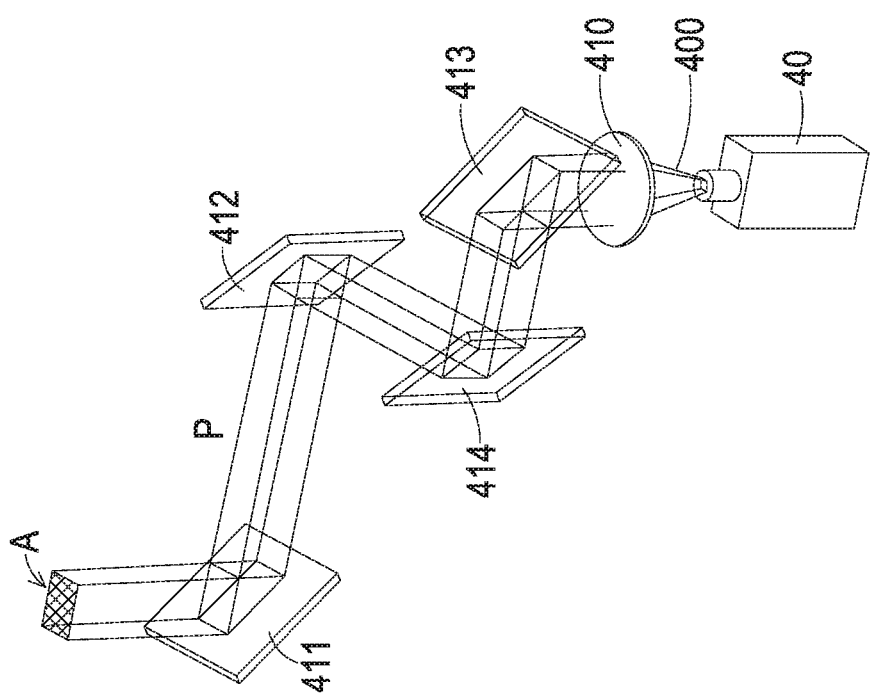
FIG. 3 schematically illustrates the structure of the optical system of the exposure molding device as shown in FIG. 2.

Please refer to FIG. 1, FIG. 2 and FIG. 3. FIG. 1 schematically illustrates the configuration of an exposure molding device according to an embodiment of the present invention. FIG. 2 schematically illustrates the configuration of an exposure molding device according to another embodiment of the present invention. FIG. 3 schematically illustrates the structure of the optical system of the exposure molding device as shown in FIG. 2. As shown in FIG. 1, FIG. 2 and FIG. 3, the exposure molding device 1 comprises an exposure tank 2, a working platform 3, and an optical system 4. The exposure tank 2 has a first surface 21 and a second surface 22, photosensitive liquid 5 is accommodated within the exposure tank 2, the working platform 3 is disposed relative to the first surface 21, and the optical system 4 is disposed relative to the second surface 22.

The optical system 4 comprises a light emission element 40 and an optical assembly 41, and the light emission element 40 emits light 400 along an optical path P, among which the light emission element 40 is not limited to be selected from the DLP, LED, or LCD array light sources, but not limited herein. The optical assembly 41 comprises a light transparent element 410, a first optical element 411, and a first transmission mechanism 4110. The light transparent element 410 is disposed on the optical path P, the first optical element 411 is disposed behind the light transparent element 410 on the optical path P, and the first transmission mechanism 4110 is disposed along a first direction d1 and connected with the first optical element 411 for driving the first optical element 411 to move along the first direction d1. After the light 400 is transmitted through the light transparent element 410, the light 400 is reflected to the exposure tank 2 by the first optical element 411, such that the photosensitive liquid 5 is exposed and molded on the working platform 3. That is, the optical system 4 of the present invention is constructed to move a projection region A, such that the photosensitive liquid 5 at a to-be-exposed region B is exposed and molded on the working platform 3. (In FIG. 1, the projection region A is equal to the to-be-exposed region B.)

In some embodiments, the optical assembly 41 further comprises a second optical element 412 and a second transmission mechanism 4120. The second optical element 412 is disposed between the light transparent element 410 and the first optical element 411 on the optical path P, and the second transmission mechanism 4120 is disposed along a second direction d2 and connected with the second optical element 412 for driving the second optical element 412 to move along the second direction d2. Therefore, by moving the first optical element 411 and the second optical element 412 through the first transmission mechanism 4110 and the second transmission mechanism 4120, the optical path P of the light 400 can be changed.

The exposure molding device 1 of the present invention further comprises a third transmission mechanism 30 and a feeding device 6. The third transmission mechanism 30 is connected with the working platform 3 for driving the working platform 3 to move along a third direction d3, and the feeding device 6 is disposed on the exposure tank 2 for supplying the photosensitive liquid 5, among which the first direction d1, the second direction d2, and the third direction d3 are perpendicular to each other, but not limited herein.

In some embodiments, the optical assembly 41 further comprises a first optical compensating element 413 and a second optical compensating element 414, which are disposed between the light transparent element 410 and the second optical element 412 on the optical path P. In addition, the first optical compensating element 413 is disposed parallel to the first optical element 411, and the second optical compensating element 414 is disposed parallel to the second optical element 412.

That is to say, the light 400 is transmitted along the optical path P, transmitted through the light transparent element 410, reflected to the second optical element 412 by the first optical compensating element 413 and the second optical compensating element 414, further reflected to the first optical element 411 by the second optical element 412, and reflected to the exposure tank 2 by the first optical element 411, such that the projection area A is formed, and the photosensitive liquid 5 is exposed and molded on the working platform 3.

In some embodiments, the moving operations is performed by the first transmission mechanism 4110, the second transmission mechanism 4120, and the third transmission mechanism 30 are used to implement the movement through threaded rods, leather belts or steel ropes, but not limited thereto. In other embodiments, the light transparent element 410 is not limited to be a focusing lens, such that the light 400 can be focused as parallel light. The curvature of the light transparent element 410 and the distance between the light emission element 40 and the light transparent element 410 are relevant to the projection region A and the resolution of the exposure molding device 1. Furthermore, the first optical element 411, the second optical element 412, the first optical compensating element 413, and the second optical compensating element 414 are reflecting mirrors, but not limited herein.

In brief, the exposure molding device of the present invention through disposing the movable optical elements to expand the molding range, and the accuracy, resolution and velocity of molding are ensured. Meanwhile, through disposing the optical compensating elements, the difference of the optical path caused by moving the optical elements is complemented, such that the distortion and deformation of the projection region are prevented, and the molding quality is ensured.

Figure 4:
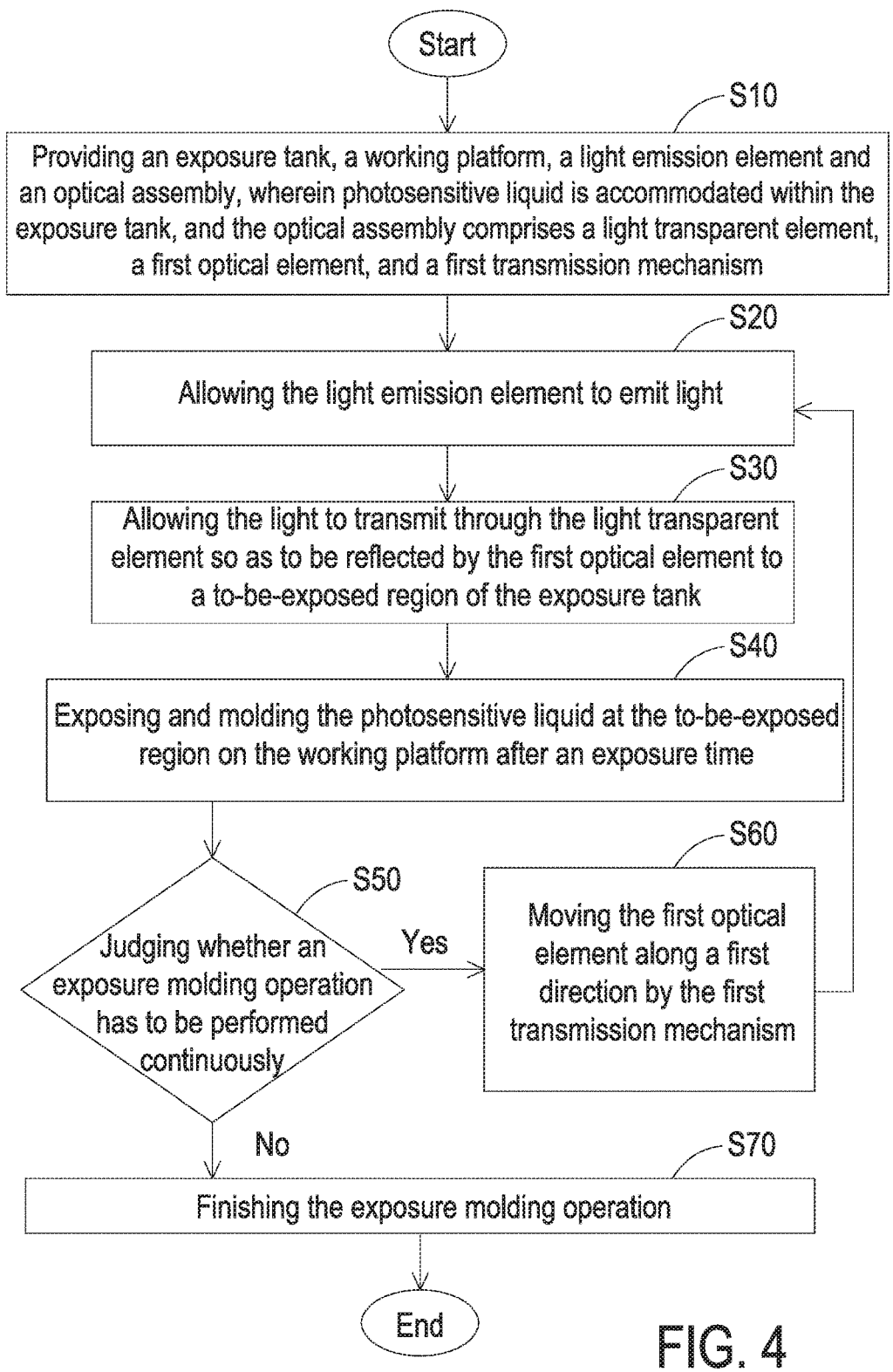
FIG. 4 schematically illustrates the flowchart of an exposure molding method of an exposure molding device according to an embodiment of the present invention.

Please refer to FIG. 1 and FIG. 4. FIG. 4 schematically illustrates the flowchart of an exposure molding method of an exposure molding device according to an embodiment of the present invention. As shown in FIG. 1 and FIG. 4, the exposure molding method of the exposure molding device 1 comprises the following steps. Firstly, in a step S10, an exposure tank 2, a working platform 3, a light emission element 40 and an optical assembly 41 are provided, among which photosensitive liquid 5 is accommodated within the exposure tank 2, and the optical assembly 41 comprises a light transparent element 410, a first optical element 411, and a first transmission mechanism 4110.

Then, in a step S20, light 400 is emitted by the light emission element 40, among which the light emission element 40 is selected from the DLP, LED, or LCD array light sources, but not limited herein. Then, in a step S30, the light 400 is transmitted through the light transparent element 410 so as to be reflected by the first optical element 411 to a to-be-exposed region B of the exposure tank 2. Then, in a step S40, the photosensitive liquid 5 at the to-be-exposed region B is exposed and molded on the working platform 3 after an exposure time Te.

Then, in a step S50, judge whether an exposure molding operation has to be performed continuously. If the result of the judgement of the step S50 is True, the step S60 is performed, and then the step S20 to the step S50 are re-performed again. In the step S60, the first optical element 411 is moved along a first direction d1 by the first transmission mechanism 4110. If the result of the judgement of the step S50 is False, the step S70 is performed to finish the exposure molding operation.

Figure 5:
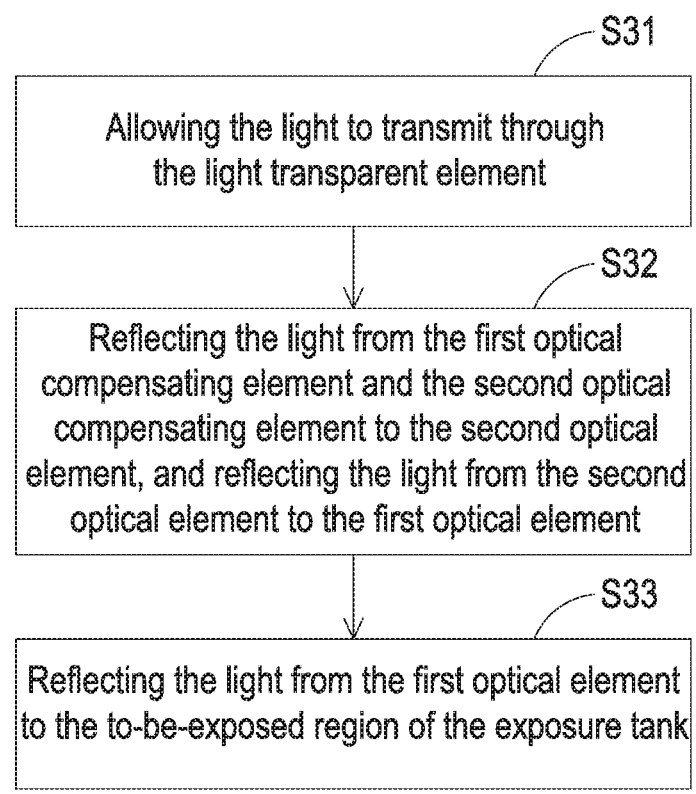
FIG. 5 schematically illustrates the detailed flowchart of the step S30 of the exposure molding method as shown in FIG. 4.
Figure 6:
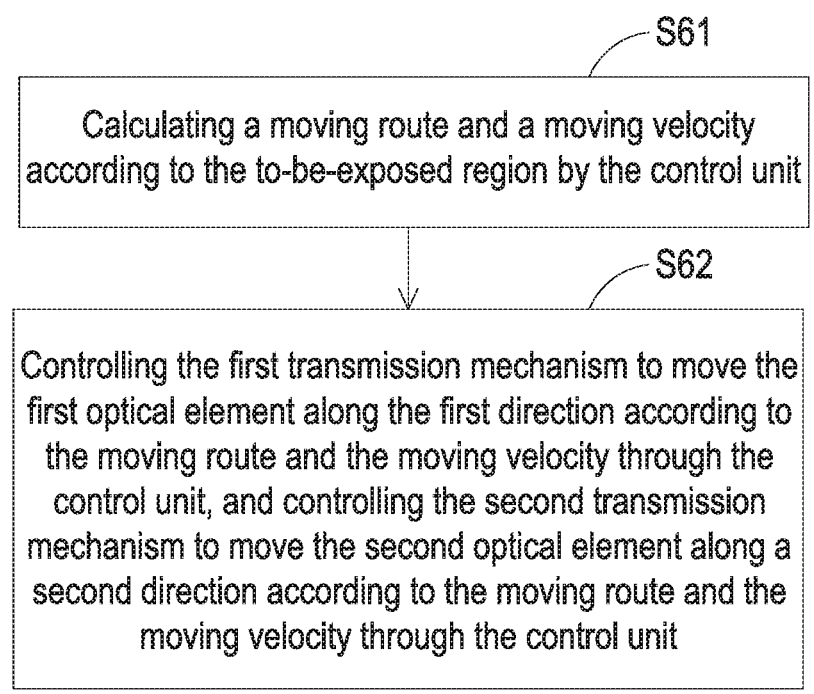
FIG. 6 schematically illustrates the detailed flowchart of the step S60 of the exposure molding method as shown in FIG. 4.

Please refer to FIG. 2, FIG. 3, FIG. 4, FIG. 5 and FIG. 6. FIG. 5 schematically illustrates the detailed flowchart of the step S30 of the exposure molding method as shown in FIG. 4. FIG. 6 schematically illustrates the detailed flowchart of the step S60 of the exposure molding method as shown in FIG. 4. As shown in FIG. 2, FIG. 3, FIG. 4, FIG. 5 and FIG. 6, the optical assembly 41 in the exposure molding method of the present invention further comprises a second optical element 412, a first optical compensating element 413 and a second optical compensating element 414, and the step S30 further comprises the following sub-steps. Firstly, in a step S31, the light 400 is transmitted through the light transparent element 410. Then, in a step S32, the light 400 is reflected to the second optical element 412 by the first optical compensating element 413 and the second optical compensating element 414, and then reflected to the first optical element 411 by the second optical element 412. Then, in a step S33, the light 400 is reflected from the first optical element 411 to the to-be-exposed region B of the exposure tank 2.

The optical assembly 41 in the exposure molding method of the present invention further comprises a control unit (not shown) and a second transmission mechanism 4120, and the step S60 further comprises the following sub-steps. Firstly, in a step S61, a moving route and a moving velocity are calculated according to the to-be-exposed region B by the control unit. Then, in a step S62, the first transmission mechanism 4110 is controlled to move the first optical element 411 along the first direction d1 according to the moving route and the moving velocity through the control unit, and the second transmission mechanism 4120 is controlled to move the second optical element 412 along a second direction d2 according to the moving route and the moving velocity through the control unit, among which the first direction d1 is perpendicular to the second direction d2.

Figure 7A:
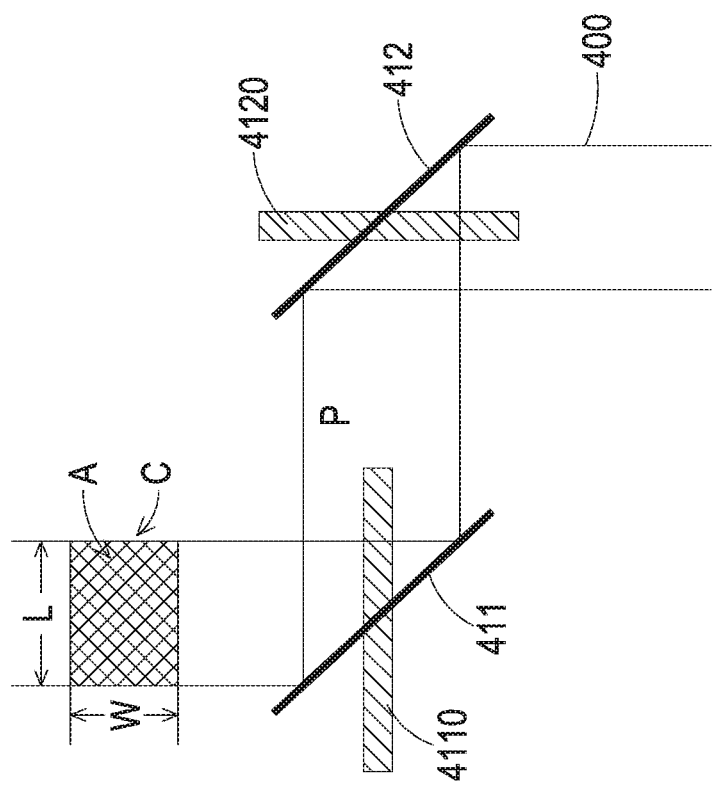
FIG. 7A schematically illustrates the application of an exposure molding method according to an embodiment of the present invention.
Figure 7B:
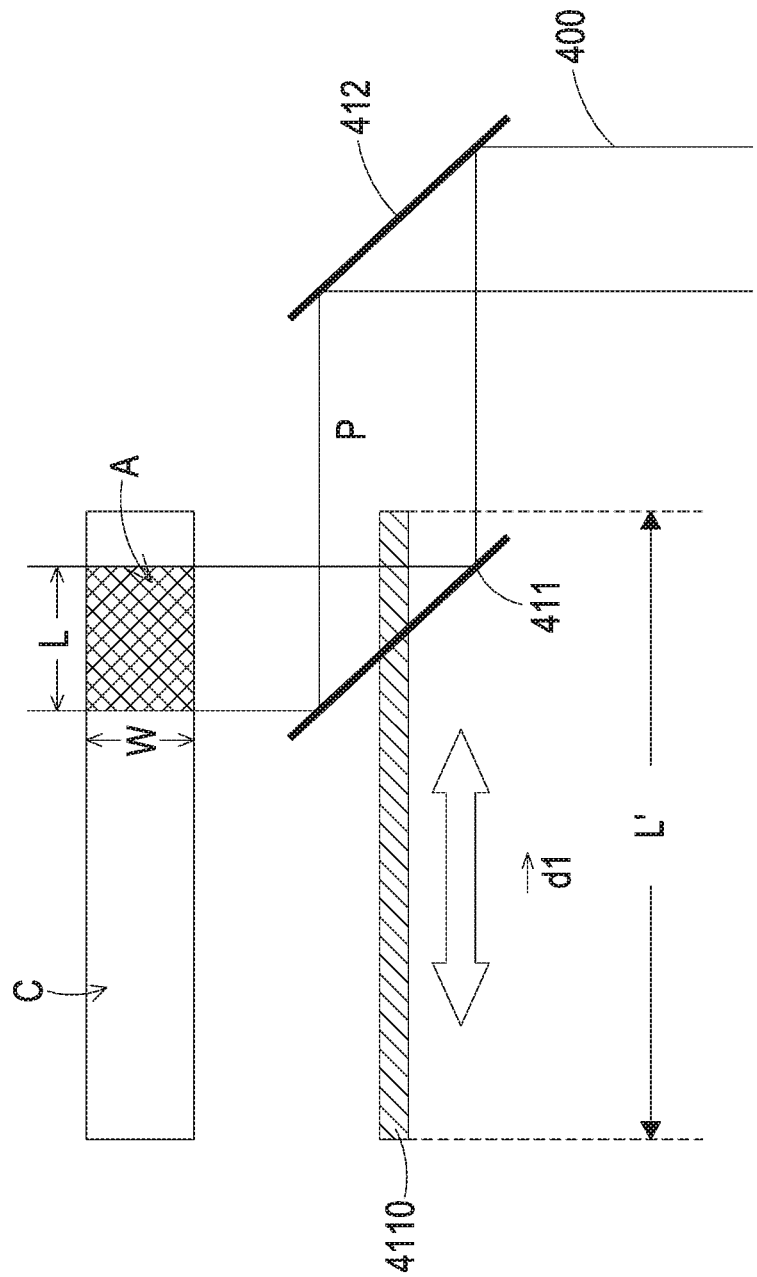
FIG. 7B schematically illustrates the application of an exposure molding method according to another embodiment of the present invention.
Figure 7C:
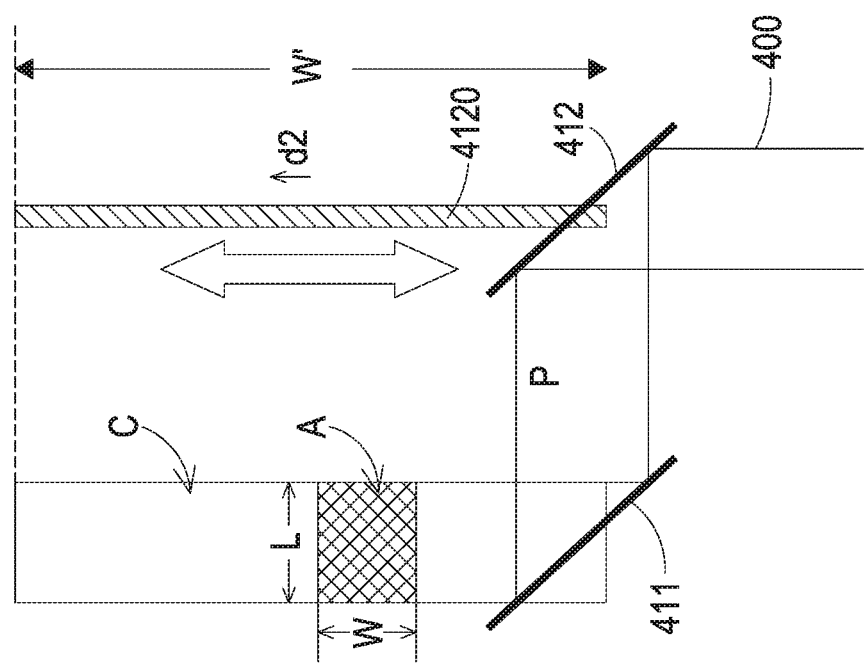
FIG. 7C schematically illustrates the application of an exposure molding method according to another embodiment of the present invention.
Figure 7D:
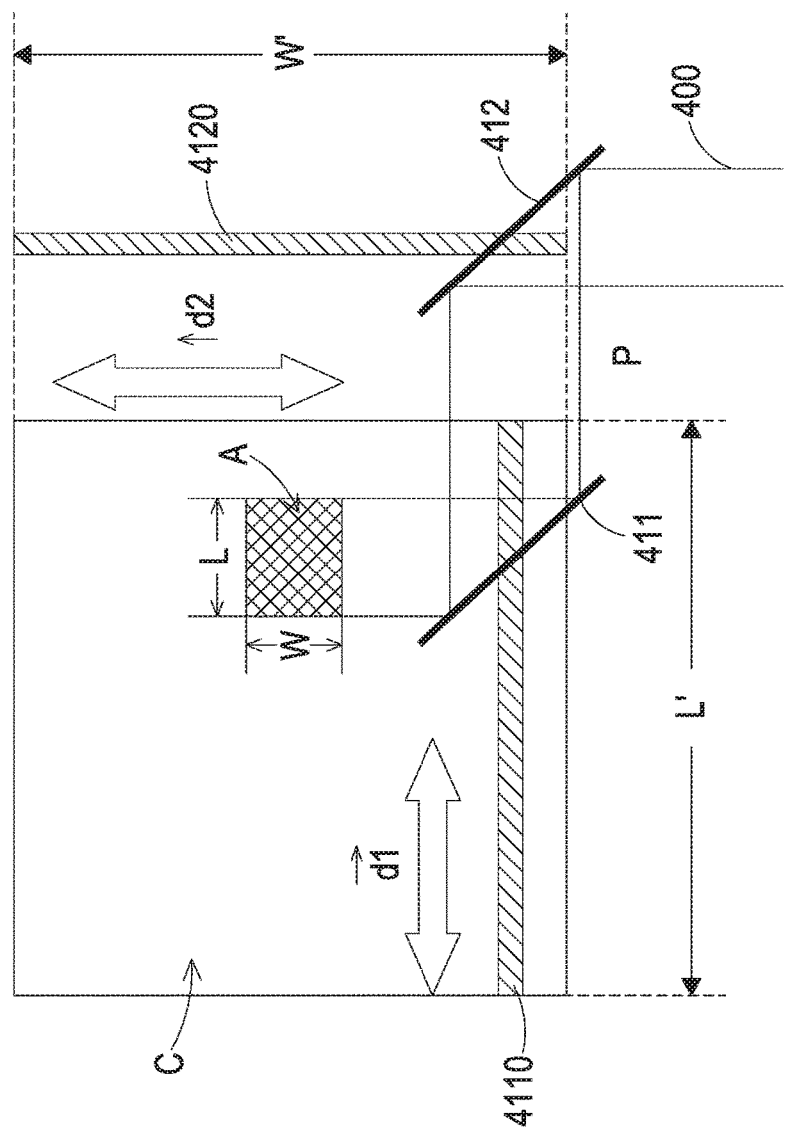
FIG. 7D schematically illustrates the application of an exposure molding method according to still another embodiment of the present invention.

Please refer to FIG. 7A, FIG. 7B, FIG. 7C, and FIG. 7D. FIG. 7A schematically illustrates the application of an exposure molding method according to an embodiment of the present invention. FIG. 7B schematically illustrates the application of an exposure molding method according to another embodiment of the present invention. FIG. 7C schematically illustrates the application of an exposure molding method according to another embodiment of the present invention. FIG. 7D schematically illustrates the application of an exposure molding method according to still another embodiment of the present invention. As shown in FIG. 7A, FIG. 7B, FIG. 7C, and FIG. 7D, the light 400 is transmitted along the optical path P, reflected to the first optical element 411 by the second optical element 412, and reflected by the first optical element 411, such that a projection region A is formed, among which the projection region A has a projection length L and a projection width W, and the area of a molding region C of the molding method is L*W. In some embodiments, the first optical element 411 is driven by the first transmission mechanism 4110 to move along the first direction d1 with a first length L', such that the area of the molding region C is expanded as L'*W. In other embodiments, the second optical element 412 is driven by the second transmission mechanism 4120 to move along the second direction d2 with a second length W', such that the area of the molding region C is expanded as L*W'. In still some embodiments, the first optical element 411 is driven by the first transmission mechanism 4110 to move along the first direction d1 with the first length L', and the second optical element 412 is driven by the second transmission mechanism 4120 to move along the second direction d2 with the second length W', such that the area of the molding region C is expanded as L'*W'.

Figure 8A:
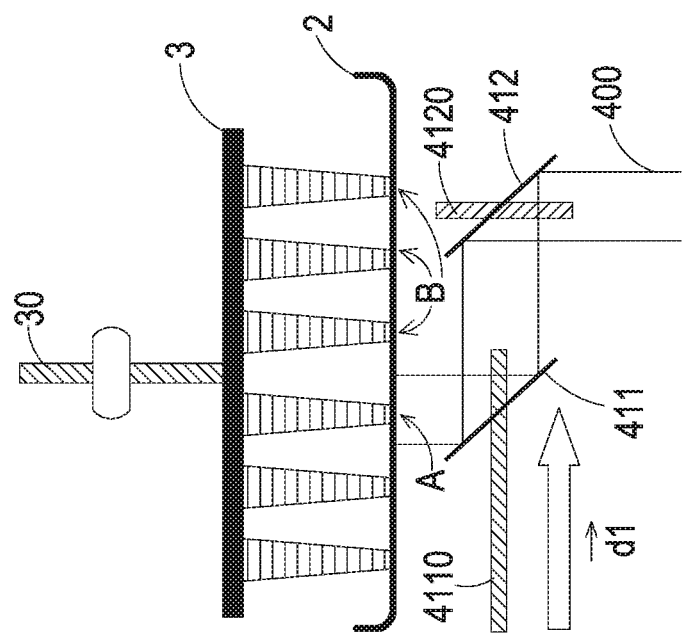
FIG. 8A schematically illustrates a step of an exposure molding operation performed by an exposure molding method of an exposure molding device according to an embodiment of the present invention.
Figure 8B:
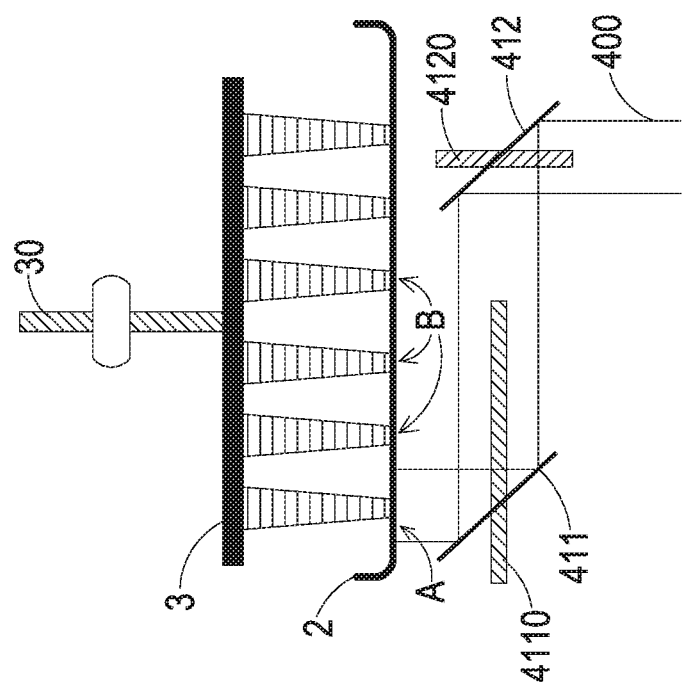
FIG. 8B schematically illustrates another step of the exposure molding operation performed by the exposure molding method of the exposure molding device according to the embodiment of the present invention.

Please refer to FIG. 8A and FIG. 8B. FIG. 8A schematically illustrates a step of an exposure molding operation performed by an exposure molding method of an exposure molding device according to an embodiment of the present invention. FIG. 8B schematically illustrates another step of the exposure molding operation performed by the exposure molding method of the exposure molding device according to the embodiment of the present invention. As shown in FIG. 8A and FIG. 8B, when the to-be-exposed region B is smaller than the projection area A, which means that the to-be-exposed region B can be completely covered by the projection region A, the first transmission mechanism 4110 or the second transmission mechanism 4120 is held at the original position till the to-be-exposed region B is exposed to solidify and molded. Then, the first optical element 411 or the second optical element 412 is driven to rapidly move to the next to-be-exposed region B by the first transmission mechanism 4110 or the second transmission mechanism 4120, such that this to-be-exposed region B is exposed and molded. After all of the to-be-exposed regions B are exposed and molded, a layer-changing operation is performed, and then the exposure molding operation of the next layer is performed.

When the first optical element 411 or the second optical element 412 is moved, the optical path length D is changed. When the optical path length D is increased, the exposure optical power We is affected by the medium and then decreased, such that the exposure time Te has to become longer. Therefore, each of the required exposure times Te corresponded to each to-be-exposed region B is different. It is assumed that there is a relationship between the exposure time Te and the exposure optical power We given by a formula F(D), which is relevant to the projection frequency, the light wavelength, and the medium transmission, among which "D" represents the optical path length, Te=F(D)*We and Te∝1/We. According to this formula F(D), the exposure time Te at different to-be-exposed region B is calculated by the control unit.

Figure 9:
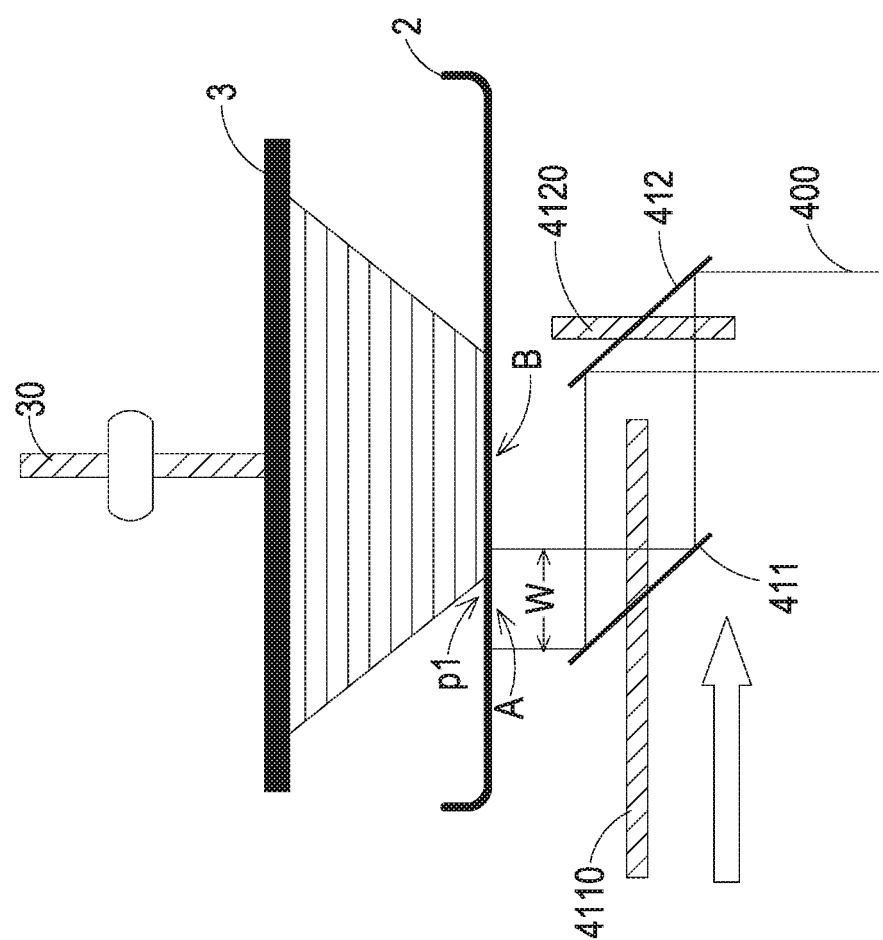
FIG. 9 schematically illustrates an exposure operation performed by an exposure molding method of an exposure molding device according to another embodiment of the present invention.

Please refer to FIG. 9. FIG. 9 schematically illustrates an exposure operation performed by an exposure molding method of an exposure molding device according to another embodiment of the present invention. As shown in FIG. 9, when the to-be-exposed region B is larger than the projection area A, which means that the to-be-exposed region B cannot be covered by the projection region A, the moving route, the moving velocity V and the exposure time of each pixel Tep are calculated by the control unit according to the formula Te=F(D)*We, which is relevant to the exposure time Te and the exposure optical power We, among which Te∝1/We, and the first transmission mechanism 4110 or the second transmission mechanism 4120 is controlled by the control unit. Thereby, the exposure molding operation is performed continuously, among which the moving route is decided by the slice section of each layer. In addition, the location accuracy $P_L$ is equal to the resolution R, integral multiples of the resolution R, or one over an integer of the resolution R. That is, $P_L$=R, $P_L$=N*R, or $P_L$=R/N, among which N is an integer.

The moving velocity V is relevant to the update frequency f of the light emission element 40 and the exposure time of the pixel Tep, the moving velocity V is integral multiples of the projection period, and V=$P_L$*f/N, among which N is an integral. In addition, when the projection region A is moved, the exposure time of each pixel Tep should be satisfied. For example, a pixel p1 is a point region at the to-be-exposed region B, and the projection width W is exposed continuously by the exposure molding device 1 with the moving velocity V, such that V≤W/Tep. Further, since multiple pixels are exposed simultaneously at the projection region A, and the exposure time of each pixel Tep is different from each other, so the longest exposure time Tep1 should be satisfied, such that V≤W/Tep1 and V=$P_L$*f/N, among which N is an integral. That is to say, the exposure time Te is inversely proportional to the optical path length D of the light 400, and the moving velocity V is inversely proportional to the exposure time Te. As above relationships, the best moving route and the best moving velocity are calculated by the control unit according to each to-be-exposed region B, and each to-be-exposed region B is exposed for a specific time, such that the photosensitive liquid 2 is solidified and molded. After all of the to-be-exposed regions B are exposed and molded, a layer-changing operation is performed, and then the exposure molding operation of the next layer is performed.

In brief, the exposure molding device and the exposure molding method thereof of the present invention through moving light weight optical elements, and calculating the moving velocity and the moving route according to the exposure time to achieve the advantages of enhancing the accuracy, velocity and quality of molding.

From the above description, the present invention provides an exposure molding device and an exposure molding method thereof. By disposing the movable optical elements, the molding range is expanded, and the accuracy, resolution and velocity of molding are ensured. Further, through disposing the optical compensating elements, the difference of the optical path caused by moving the optical elements is complemented, such that the distortion and deformation of the projection region are prevented, and the molding quality is ensured. Meanwhile, by moving light weight optical elements and calculating the moving velocity and the moving route according to the exposure time, the advantages of enhancing the accuracy, velocity and quality of molding are achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An exposure molding device, comprising:
   an exposure tank having a first surface and a second surface, wherein photosensitive liquid is accommodated within the exposure tank;
   a working platform disposed relative to the first surface; and
   an optical system disposed relative to the second surface and comprising:
   a light emission element emitting light along an optical path; and
   an optical assembly comprising:
   a light transparent element disposed on the optical path;
   a first optical element disposed behind the light transparent element on the optical path;
   a first transmission mechanism disposed along a first direction, and connected with the first optical element for driving the first optical element to move along the first direction;
   a second optical element disposed between the light transparent element and the first optical element on the optical path; and
   a first optical compensating element and a second optical compensating element disposed between the light transparent element and the second optical element on the optical path, wherein the first optical compensating element is disposed parallel to the first optical element, and the second optical compensating element is disposed parallel to the second optical element,
   wherein after the light is transmitted through the light transparent element, the light is reflected to the exposure tank by the first optical element, such that the photosensitive liquid is exposed and molded on the working platform.

2. The exposure molding device according to claim 1, wherein the optical assembly further comprises:
   a second transmission mechanism disposed along a second direction, and connected with the second optical element for driving the second optical element to move along the second direction.

3. The exposure molding device according to claim 2 further comprising:
   a third transmission mechanism connected with the working platform for driving the working platform to move along a third direction; and
   a feeding device disposed on the exposure tank for supplying the photosensitive liquid.

4. The exposure molding device according to claim 3, wherein the first direction, the second direction, and the third direction are perpendicular to each other.

5. The exposure molding device according to claim 1, wherein the light transparent element is a focusing lens, and the first optical element, the second optical element, the first optical compensating element, and the second optical compensating element are reflecting mirrors.

6. An exposure molding method, comprising steps of:
   (a) providing an exposure tank, a working platform, a light emission element and an optical assembly, wherein photosensitive liquid is accommodated within the exposure tank, and the optical assembly comprises a light transparent element, a first optical element, a first transmission mechanism, a second optical element, a first optical compensating element and a second optical compensating element, wherein the first optical compensating element is disposed parallel to the first optical element, and the second optical compensating element is disposed parallel to the second optical element;
   (b) allowing the light emission element to emit light;
   (c1) allowing the light to transmit through the light transparent element;
   (c2) reflecting the light from the first optical compensating element and the second optical compensating element to the second optical element, and reflecting the light from the second optical element to the first optical element;
   (c3) reflecting the light from the first optical element to the to-be-exposed region of the exposure tank;
   (d) exposing and molding the photosensitive liquid at the to-be-exposed region on the working platform after an exposure time;
   (e) judging whether an exposure molding operation has to be performed continuously;
   (f) moving the first optical element along a first direction by the first transmission mechanism; and
   (g) finishing the exposure molding operation;
   wherein if the result of the judgement of the step (e) is True, the step (f) is performed, and then the step (b) to the step (e) are re-performed again, and wherein if the result of the judgement of the step (e) is False, the step (g) is performed.

7. The exposure molding method according to claim 6, wherein the optical assembly further comprises a control unit and a second transmission mechanism, and the step (f) further comprises sub-steps of:
   (f1) calculating a moving route and a moving velocity according to the to-be-exposed region by the control unit; and
   (f2) controlling the first transmission mechanism to move the first optical element along the first direction according to the moving route and the moving velocity through the control unit, and controlling the second transmission mechanism to move the second optical element along a second direction according to the moving route and the moving velocity through the control unit, wherein the first direction is perpendicular to the second direction.

8. The exposure molding method according to claim 7, wherein the exposure time is inversely proportional to an optical path length of the light, and the moving velocity is inversely proportional to the exposure time.

* * * * *